United States Patent [19]
Orthman

[11] 3,731,429
[45] May 8, 1973

[54] TOMATO VINE SUPPORT
[75] Inventor: Henry K. Orthman, Lexington, Nebr.
[73] Assignee: Orthman Manufacturing Inc., Lexington, Nebr.
[22] Filed: Dec. 16, 1970
[21] Appl. No.: 98,687

[52] U.S. Cl. .................47/47, 248/221, 248/225, 211/107
[51] Int. Cl. ..............................A01g 17/14
[58] Field of Search............ 47/44–47; 248/221, 225; 211/107, 134

[56] References Cited
UNITED STATES PATENTS

| | | | |
|---|---|---|---|
| 425,745 | 4/1890 | Brown | 47/47 |
| 1,337,803 | 4/1920 | Stanley | 47/47 |
| 1,627,495 | 5/1927 | Effley | 47/47 |
| 2,173,217 | 9/1939 | Thomsen | 47/47 |
| 2,764,846 | 10/1956 | Worthington | 47/47 |
| 2,851,823 | 9/1958 | Peterson | 47/47 |

FOREIGN PATENTS OR APPLICATIONS

| | | | |
|---|---|---|---|
| 626,650 | 7/1934 | Germany | 47/45 |

Primary Examiner—Robert E. Bagwill
Attorney—Zarley, McKee & Thomte

[57] ABSTRACT

A plurality of vertically spaced apart concentric ring assemblies are adjustably and removably cantilevered to a post. Each of the ring assemblies includes a plurality of vertically spaced apart concentric rings defining a frustro conical shape. A ledge is provided outwardly of the top ring. A bracket on the cantilever engages a pair of vertically spaced apart shoulders on the face of the cross of a T-shaped post.

9 Claims, 5 Drawing Figures

Patented May 8, 1973  3,731,429
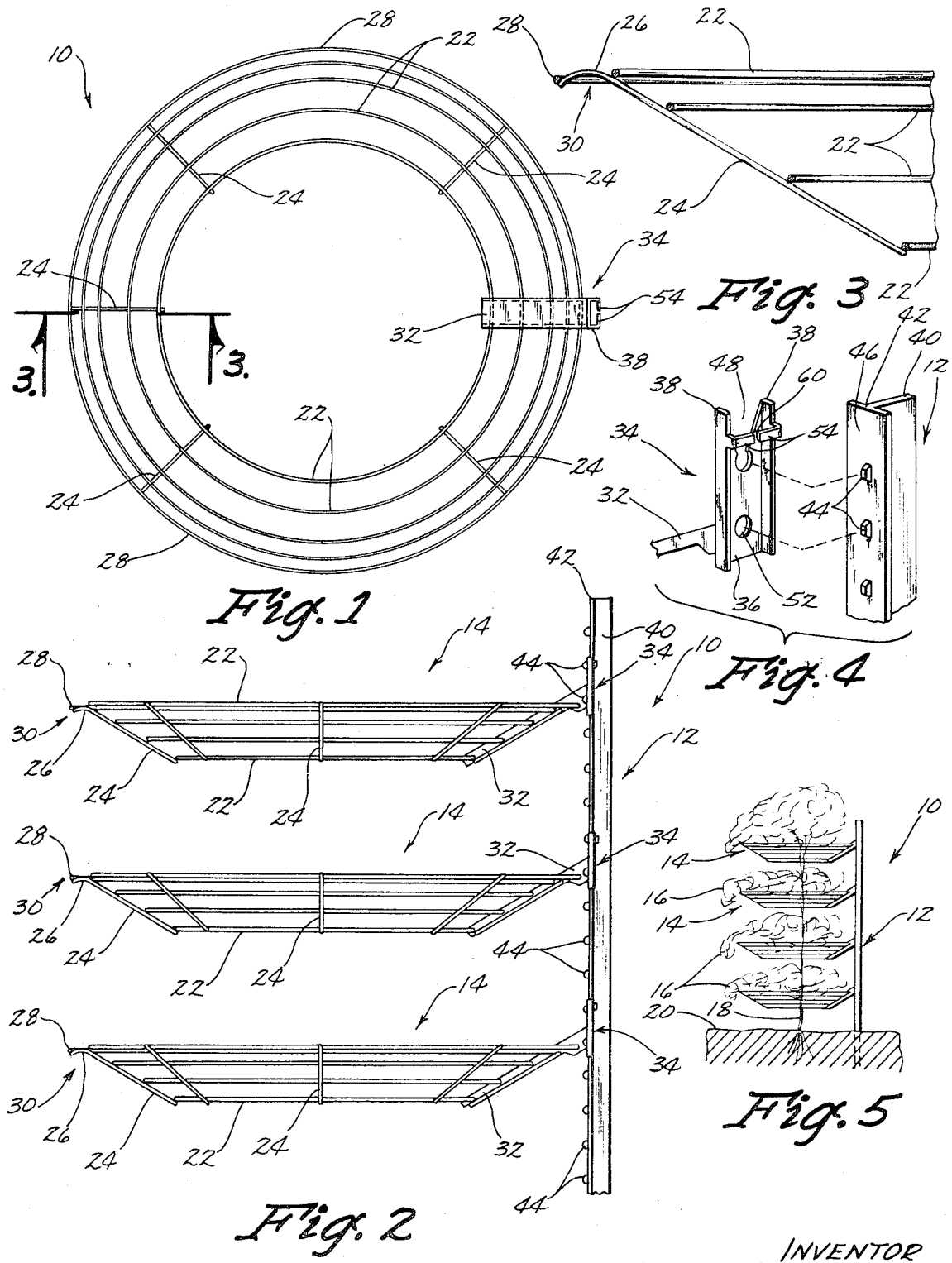
INVENTOR
HENRY K. ORTHMAN
BY
Zarley, McKee & Thomte
ATTORNEYS

TOMATO VINE SUPPORT

The tomato vine support of this invention allows the tomato plant to grow upwardly rather than remain on the ground under the weight of the plant and tomatoes produced. As the plant grows taller an additional ring assembly is attached to the post and the plant will grow on higher into the next ring assembly where it will receive support for the plant and the tomatoes. Each ring assembly flares outwardly to accommodate the plant and also provides a rounded ledge at the top to prevent breaking of the plant limbs. The ring assemblies are completely open and maintain the plant off the ground to give it maximum exposure to the sun for maximum growth. The steel T-shaped post is set in the ground remotely of the plant and thus allows the plant to grow without interference. The bracket for each of the ring assemblies permits quick attachment and adjustment on the post.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a top plan view of the tomato vine support of this invention;

FIG. 2 is a side elevational view thereof;

FIG. 3 is a cross sectional view taken along line 3—3 in FIG. 1;

FIG. 4 is an exploded perspective view of the bracket connecting the ring assembly to the post; and FIG. 5 is a reduced in scale side elevational view of the vine support in use.

The vine support of this invention is referred to generally in FIG. 5 by the reference numeral 10 and is seen to include a T-shaped in cross section steel post 12 from which ring assemblies 14 are cantilevered for supporting vertically spaced apart tomato plant limbs 16 extending from the tomato plant trunk 18 rooted in the ground 20.

The ring assemblies 14 are frustro conical in shape and include a plurality of rings 22 progressively larger in diameter from bottom to top and are interconnected by vertically extending elements 24 spaced apart peripherally around the rings 22. The elements 24 are straight for their substantial length but terminate in a convex upwardly and outwardly extending portion 26 to which a laterally outwardly disposed ring 28 is secured to provide a ledge 30 for supporting the plant limbs 16 to minimize breakage of the limbs.

Each of the ring assemblies 14 are similarly constructed and include four rings with the uppermost ring being concentrically embraced in substantially the same horizontal plane by the ring 28 which cooperates with the convex upwardly portions 26 and the uppermost ring 22 to provide the ledge 30. Also, each of the ring assembles 14 include a support arm 32 interconnecting each of the rings 22 and having a bracket 34 for engagement with the post 12. The bracket 34 is channel shaped with a base 36 and opposite leg portions 38. The post 12, which is T-shaped, includes a staff 40 and a cross portion 42 which includes vertically spaced apart outwardly projecting shoulders 44 on the outer face 46.

A base 36 of the bracket 34 includes a downwardly extending V-shaped notch 48 having an opening 50 at its vertex for registry with the shoulder 44 on the post 12. A lower opening 52 registers with the next lower shoulder 44. A pair of inwardly extending elements 54 are provided on the back side of each of the channel legs 38 for cooperation with the legs 38 and the base 36 to define a passageway through which the cross 46 of the post 12 may extend. The elements 54 have a space 60 therebetween which corresponds substantially with the thickness of the staff 40 of the post 12.

It is seen in operation that upon a plant starting its growth a single ring assembly 14 would be utilized supported on a post 12 anchored in the ground 20. The ring assembly 14 may easily be slipped onto the post from the top and adjustably slid along the post by tilting the lower end of the bracket 34 outwardly so that it may slide along the post. The weight of the ring assembly will maintain the lower end of the bracket in engagement with the post and maintain the shoulders 44 in registry with the openings 50 and 52. It is seen that the elements 54 engaging the back side of the cross portion 46 of the post are high enough above the opening 50 to permit the tilting outwardly of the lower end of the bracket to facilitate the moving along the post. After the desired location has been reached on the post the lower end of the bracket is tilted downwardly into engagement with the face 46 and the shoulders 44 then extend through the openings 50 and 52 as seen in FIG. 2.

The first stage of growth of the plant 18 produced limbs 16 which will fill the first ring assembly 14 while the outer ends of the limbs will be comfortably supported by the rounded ledge 30. Upon the first ring assembly being substantially filled, a second ring assembly is appropriately spaced above it and the plant will naturally grow on upwardly toward the sunlight and thread its way through the opening of the ring assembly and root itself in the rings of the assembly thereby obtaining support for that section of the tomato plant. This procedure is continued until the plant has reached its maximum height. Upon the tomatoes being harvested the tomato vine support may be quickly disassembled and reused.

I claim:

1. A tomato vine support comprising;
    at least one ring assembly including a plurality of concentric vertically spaced apart rings secured together and being progressively larger in diameter from the bottom to the top of the assembly, said concentric vertically spaced apart rings being substantially open along their axial center extending above and below said ring assembly to provide an unobstructed opening for a ground plant to grow upwardly into said ring assembly and be supported thereby,
    a single post connected to the outer periphery of said ring assembly to provide the only support for said ring assembly,
    said ring assemblies connected to said post are further defined as including post connecting means for detachably connecting said ring assemblies to said post in selected vertical positions, and said post being T-shaped in cross section and including vertically spaced apart s shoulders on the outer face of the cross of said post, and said post connecting means including a channel shaped member having vertically spaced apart openings for receiving said shoulders when said channel shaped member is in mating engagement with said post with the legs of said channel extending along the opposite side edges of said cross, and said legs of said channel including horizontally inwardly extending elements for engaging the back side of said cross to maintain said channel and post in mating engagement with each other.

2. The structure of claim 1 wherein said inwardly extending elements are spaced apart at their inner free ends to provide an opening in which the staff of said T-shaped post is received.

3. The structure of claim 2 wherein said post connecting means interconnects each of said plurality of rings and said outer ring.

4. The structure of claim 3 wherein said plurality of concentric vertically spaced apart rings are substantially open vertically and horizontally to provide a plant maximum exposure to the sun.

5. The structure of claim 1 wherein an outer ring is in concentric horizontal spaced relation to the uppermost ring of said ring assembly and connected thereto to provide an upper peripheral ledge.

6. The structure of claim 5 wherein said secured together rings are further defined as being secured together by peripherally spaced apart ring interconnecting elements extending perpendicularly between each of said plurality of rings and said outer ring.

7. The structure of claim 1 wherein said one ring assembly is one of a plurality of ring assemblies vertically spaced apart in axial alignment on said post.

8. A tomato vine support comprising;

a plurality of vertically spaced apart ring assemblies, each assembly including a plurality of concentric vertically spaced apart rings progressively larger in diameter from the bottom to the top of each assembly, an outer ring being provided which is in concentric horizontal spaced relation to the uppermost ring of said ring assembly to provide an upper ledge, each assembly having an unobstructed center axial opening with a diameter equal to the diameter of the smallest and lowest ring, a plurality of connecting elements peripherally spaced around each ring assembly extending perpendicularly between each of said plurality of rings and said outer ring, and a single post positioned outside said ring assemblies and connected to the outer end of one of said connecting elements for each ring assembly to provide the only support for said ring assemblies.

9. The structure of claim 8 wherein said post is T-shaped in cross section and includes vertically spaced apart shoulders on the outer face of the cross of said post, and said post connecting element includes a channel shaped member having vertically spaced apart openings for receiving said shoulders when said channel shaped member is in mating engagement with said post with the legs of said channel extending along the opposite side edges of said cross, and said legs of said channel include horizontally inwardly extending element for engaging the back side of said cross to maintain said channel and post in mating engagement with each other.

* * * * *